Oct. 16, 1928.
A. WOLLENSAK
1,687,818
LENS MOUNT
Filed Jan. 20, 1923
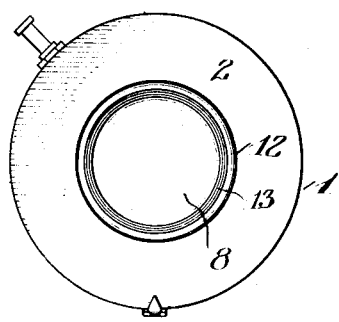
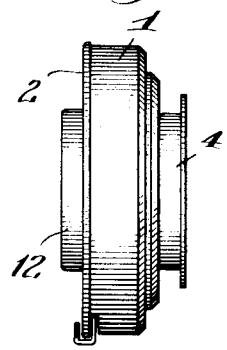
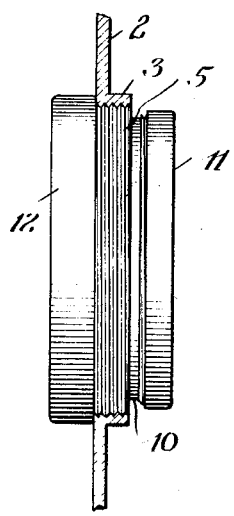
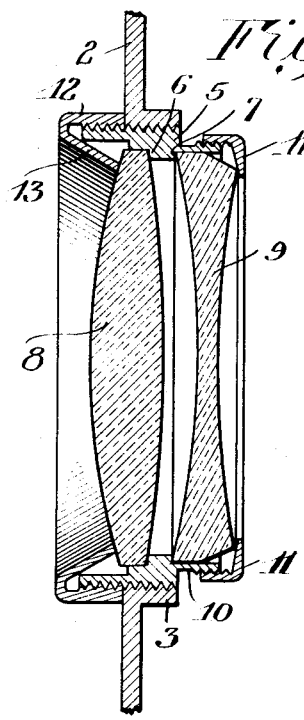
INVENTOR.
Andrew Wollensak
BY
his ATTORNEY Patented Oct. 16, 1928.

1,687,818

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

LENS MOUNT.

Application filed January 20, 1923. Serial No. 613,899.

My present invention relates to optics and more particularly to lens mounts and it has for its object to provide a simple and convenient mount that can be produced at low cost and which will be provided with accurately fitting means for holding the lens to its seat. The improvements are further directed toward providing an arrangement whereby the lens securing ring also acts as a stop for giving the proper distance between the focal plane and the lens board or supporting medium. To these and other ends the invention resides in certain improvements and combinations of parts all as will be hereinafter more fully described, the novel features being pointed out in the claims at the end of the specification.

In the drawings:

Figure 1 is a front view of a lens mount constructed in accordance with and illustrating one embodiment of my invention, the same being shown attached to a photographic shutter;

Figure 2 is a side view thereof;

Figure 3 is an enlarged fragmentary section thru the supporting plate of the shutter showing the lens mount in side elevation and Figure 4 is a further enlarged central section through the lens mount and a fragment of the supporting plate.

Similar reference numerals throughout the several views indicate the same parts.

As before indicated I have illustrated the lens mount in the present instance applied to the casing of a photographic shutter 1 of which the front plate 2 serves the function of a lens board or supporting element for which purpose it is formed at its central opening with a rearwardly or inwardly turned collar 3. The shutter is secured to the camera front in a uniformly definite position by devices common in the art including a flanged ring nut 4.

The collar 3 is interiorly threaded to receive an exteriorly threaded lens tube 5 that may be adjusted therein to the proper degree of projection. Within the tube are two oppositely faced lens seats 6 and 7, the one for the convex front lens 8 of the system and the other for the concave rear lens 9. A reduced portion 10 of the tube is threaded exteriorly to receive the interiorly threaded flange of a retaining ring 11 that contacts the rear face of the lens 9 at its edges and holds it to its seat.

The front lens 8 is set back within the tube and the threaded forward end thereof projecting from the shutter plate 2 receives the interiorly threaded lens ring 12. The forward edge of this ring is spun or otherwise extended and inclined inwardly and rearwardly as indicated at 13 to engage the convex face of the lens 8 near its edge and hold it to its seat well within the tube.

There are several advantages for this construction. It avoids the necessity of cutting interior threads on the tube which must be done with the usual form of lens securing ring because the same threads are used for the ring that are used to fit the tube into the supporting plate. The thin edge presented to the lens surface fits the same firmly and easily with a centering tendency. Additionally, the rear end of the ring 12, being on the outside of the tube abuts the plate 2 and positions the lens mount in the shutter casing at the proper distance from the focal plane or at least with proper reference to the shutter casing and its distance from the focal plane of the camera. If contact of the portion 13 of the ring with the lens prevents the ring from reaching the plate 2 it is an easy matter to turn down or shorten the flange 13 as required in the original fitting of the mount.

I claim as my invention:

1. In a lens mount, the combination with a tube exteriorly threaded and having an interiorly arranged lens seat and a lens arranged in said seat, of an interiorly threaded ring on the tube having an interior reversed flange extending into the latter and bearing upon the lens to hold it to its seat so that the end of the tube rests in a doubled portion of the ring and a reversed flange bears edgewise against the lens along a line spaced inwardly of the tube.

2. In a lens mount, the combination with a lens supporting plate and a lens tube exteriorly threaded therein and having an interior lens seat, and a lens in said seat, of a threaded ring on the tube bearing against the lens supporting plate and having an interior reversed flange bearing edgewise upon the lens to hold it to its seat, the tube extending into the angle formed by the reverse turn of the flange.

ANDREW WOLLENSAK.